(No Model.)
F. H. GLADDING.
SLEEVE BUTTON.
No. 341,901. Patented May 18, 1886.
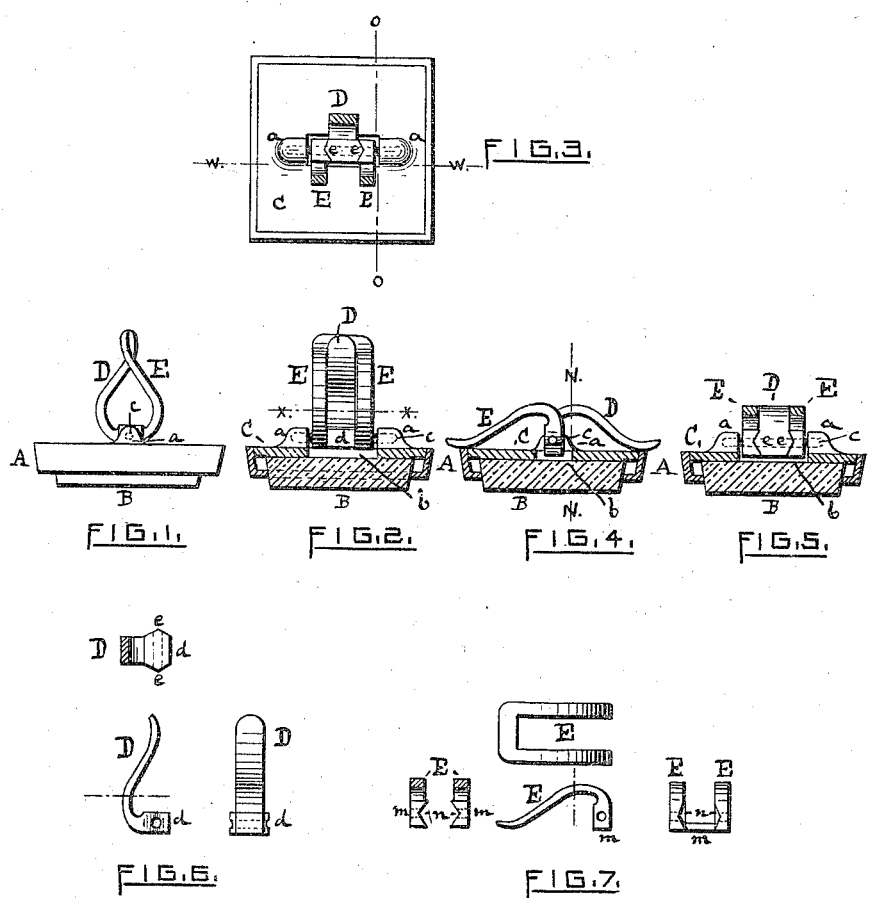
WITNESSES,
Daniel Brown
Warren R. Pierce
INVENTOR,
Frank H. Gladding

United States Patent Office.

FRANK H. GLADDING, OF PROVIDENCE, RHODE ISLAND, ASSIGNOR TO GLADDING & COOMBS BROTHERS, OF SAME PLACE.

SLEEVE-BUTTON.

SPECIFICATION forming part of Letters Patent No. 341,901, dated May 18, 1886.

Application filed March 24, 1886. Serial No. 196,358. (No model.)

*To all whom it may concern:*

Be it known that I, FRANK H. GLADDING, of the city and county of Providence, in the State of Rhode Island, have invented a certain new and useful Improvement in Sleeve-Buttons and Studs; and I declare the following to be a specification thereof, reference being had to the accompanying drawings.

Like letters indicate like parts.

Figure 1 is a side elevation of my invention. Fig. 2 is a transverse section of my improved sleeve-button on the line $w\ w$ of Fig. 3, and shows the lever-arms in front elevation. Fig. 3 is a plan view of the bottom of my improved sleeve-button, showing the lever-arms in cross-section on the line $x\ x$ of Fig. 2. Fig. 4 is a transverse section upon the line $o\ o$ of Fig. 3, and shows the lever-arms in side elevation, as seen when they are spread. Fig. 5 is a transverse section on line $N\ N$ of Fig. 4, showing the locking mechanism in front elevation when the lever-arms are down. Figs. 6 and 7 are detail views.

My invention relates to that class of sleeve-buttons or studs which have two curved lever-arms mounted pivotally on the back plate and movable in directions opposite to each other, which arms, when elevated to the full extent, unite to present a common edge to enter the button-hole, and when pushed through the button-hole are automatically spread apart by the edges of the button-hole to form a fastening device.

My invention consists of a sleeve-button having two curved lever-arms mounted and moving upon a single pivot which is secured to the back plate, one of said lever-arms being single, and having on its inner end, on each side, a cam, and the other lever-arm being a spring-loop, wherein the single lever-arm moves longitudinally, and having on its ends, on the inner sides thereof, slots to receive the cams of the single lever-arm, by which construction the levers are locked together when open or closed, as hereinafter fully specified.

In the drawings, A represents the button-front, and B the stone set therein. The back plate, C, is secured to the button-front in the usual manner. The back plate, C, is struck up from beneath to form raised sockets $a$, and it has a central rectangular slot, $b$, as seen in Figs. 2, 3, 4, and 5. A pivot, $c$, enters the sockets $a$, which form its bearings. A lever-arm, D, is a single tongue-shaped piece having the peculiar curves illustrated in the drawings. On its broader or inner end it has a hub, $d$, preferably square, which is bored transversely for the reception of the pivot $c$, on which it is mounted, and on which it has a vertically-swinging movement in one plane. This hub has two V-shaped cams, $e$—one on each side—extending outwardly, and fully shown in Figs. 3, 5, and 6. The lever-arm E is made of spring metal having sufficient temper to serve as a spring-loop. It has hubs $m$, preferably square, and these hubs are bored transversely for the reception of the pivot $c$, on which they are mounted and are movable. Each hub $m$ has on its inner side a V-shaped notch, $n$, (seen best in Fig. 7,) and extending across the whole of the inner side.

The operation of these parts, when constructed as described and combined as shown in the drawings, is as follows: When the lever-arms D E are raised to a position perpendicular with the back plate, C, their outer ends come together to form a single entering edge, as shown in Figs. 1 and 2. When thus raised, the cams $e$ of the hub of the lever D are in close engagement with the slots $n$ of the hubs of the loop-lever E, and are held firmly together by the pinching action of the normal spring-pressure of the spring-loop E. The outer ends of these levers D E, being then inserted and pushed through the button-hole, are crowded on their outwardly-curving surfaces by the edges of the button-hole, and are thus spread apart, as seen in Fig. 4. By this movement of the levers in opposite directions to each other the cams $e$ are forced out of their engaging-slots and spread the loop lever-arm E laterally outward, and traverse the square inside faces of the hubs $m$ until they come to the next openings of the slots $n$ of the hubs $m$, whereupon they are forced therein by the resilience of the spring of the loop-lever E, resuming its former normal position, and are locked in the position shown in Figs. 4 and 5.

I claim as a novel and useful invention and desire to secure by Letters Patent—

The improved sleeve-button herein described, consisting of the button-front A, the back plate, C, fastened thereto, and which has mounted pivotally thereon the single curved lever-arm D, having the hub $d$ and cams $e$, and the spring-loop curved lever-arm E, having hubs $m$ and slots $n$, said lever D being movable longitudinally within the loop of the lever E, and both levers being mounted and movable upon the pivot $c$, and adapted to be locked together at will in either of the two positions shown by the engagement of the cams $e$ with the slots $n$, substantially as specified.

FRANK H. GLADDING.

Witnesses:
DANIEL BROWN,
WARREN R. PERCE.